US012211645B2

(12) United States Patent
Ogasawara et al.

(10) Patent No.: US 12,211,645 B2
(45) Date of Patent: Jan. 28, 2025

(54) SOLENOID ACTUATOR

(71) Applicant: MIKUNI CORPORATION, Tokyo (JP)

(72) Inventors: Toshiki Ogasawara, Takizawa (JP); Hirofumi Saito, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 161 days.

(21) Appl. No.: 18/187,826

(22) Filed: Mar. 22, 2023

(65) Prior Publication Data

US 2023/0386719 A1 Nov. 30, 2023

(30) Foreign Application Priority Data

May 27, 2022 (JP) ................................ 2022-086522

(51) Int. Cl.
*H01F 7/121* (2006.01)
*H01F 7/08* (2006.01)
*H01F 7/16* (2006.01)

(52) U.S. Cl.
CPC ............ *H01F 7/121* (2013.01); *H01F 7/081* (2013.01); *H01F 7/1607* (2013.01)

(58) Field of Classification Search
CPC ........ H01F 7/121; H01F 7/081; H01F 7/1607; H01F 2007/085; H01F 2007/086; H02K 33/00; H02K 1/12; H02K 1/17; H02K 2213/03
See application file for complete search history.

(56) References Cited

U.S. PATENT DOCUMENTS 5,108,070 A * 4/1992 Tominaga ............ H01F 7/1615 251/129.1
5,303,012 A * 4/1994 Horlacher ............ H01F 7/1615 335/255
6,029,704 A * 2/2000 Kuroda .............. F16K 31/0613 137/625.65
2008/0315140 A1* 12/2008 Hamaoka ............. F01L 1/3442 251/129.15

(Continued)

FOREIGN PATENT DOCUMENTS

JP 2021174962 A 11/2021

*Primary Examiner* — Shawki S Ismail
*Assistant Examiner* — Lisa N Homza
(74) *Attorney, Agent, or Firm* — ROSSI, KIMMS & McDOWELL LLP

(57) ABSTRACT

A solenoid actuator 1 includes: a coil 3; a first stator 10 that includes a first yoke 14 and a cylindrical guide 30 fixed to an inner peripheral side of the first yoke 14; a second stator 20 arranged to face the first stator 10 in an axial direction so as to form a magnetic path 4 around the coil 3 together with the first stator 10; and a mover 50 configured to move in the axial direction toward the second stator 20 from an original position radially inward of the first stator 10 by a magnetic force generated by energizing the coil 3. The cylindrical guide 30 includes: a magnetic tube 32 disposed in contact with an inner peripheral surface of the first yoke 14; and a non-magnetic layer 34 covering an inner peripheral surface of the magnetic tube 32. A minimum distance d1 between the second stator 20 and the magnetic tube 32 is greater than a minimum distance d2 between the second stator 20 and the mover 50 at the original position.

6 Claims, 5 Drawing Sheets

(56) References Cited

U.S. PATENT DOCUMENTS

| | | | | |
|---|---|---|---|---|
| 2009/0026399 | A1* | 1/2009 | Ishibashi | F16K 31/0613 251/129.15 |
| 2014/0028423 | A1* | 1/2014 | Matsumoto | H01F 7/1607 335/282 |
| 2015/0330514 | A1* | 11/2015 | Harada | B60K 15/03519 137/484.2 |
| 2016/0071640 | A1* | 3/2016 | Kato | H01F 7/1615 335/229 |
| 2019/0131048 | A1* | 5/2019 | Bavisetti | H01F 7/1607 |
| 2020/0051723 | A1* | 2/2020 | Mahajan | H01F 7/081 |
| 2021/0343463 | A1 | 11/2021 | Amano | |
| 2022/0122753 | A1* | 4/2022 | Tomita | F16K 31/0613 |

* cited by examiner

SOLENOID ACTUATOR

TECHNICAL FIELD

The present disclosure relates to a solenoid actuator.

BACKGROUND

Conventionally, a solenoid actuator has been known in which a stator for forming a magnetic path around a coil is disposed and a mover can be moved in the axial direction by attracting the mover with a magnetic force generated by energizing the coil.

For example, Patent Document 1 describes an electromagnetic actuator that includes a first stator disposed on a stroke start position (original position) side of a movable element and a second stator disposed on a stroke end position side of the movable element.

In the electromagnetic actuator described in Patent Document 1, outer shapes of the movable element and the first stator are devised in order to achieve a constant attractive force characteristic over an entire length of a stroke of the movable element. More specifically, an outer peripheral surface of the movable element is provided with a tapered portion for narrowing a gap between the first stator and the movable element as the movable element moves toward the stroke end position. On the other hand, an end of the first stator on a second stator side is provided with a convex curved surface for widening the gap between the first stator and the movable element.

CITATION LIST

Patent Literature

Patent Document 1: JP2021-174962A

SUMMARY

Meanwhile, a solenoid actuator is required to achieve a high thrust force without impairing its compactness. Therefore, it is desired to improve the shape of a stator or a mover so that a magnetic flux can efficiently be transferred between the stator and the mover.

In this regard, Patent Document 1 proposes a contrivance of outer shapes of a mover and a first stator for the purpose of achieving a constant attractive force characteristic. However, there is still room for improvement in terms of efficiency of transfer of the magnetic flux between the stator and the mover.

In view of the above, an object of at least some embodiments of the present invention is to provide a solenoid actuator capable of efficiently transferring the magnetic flux between the stator and the mover.

[1] A solenoid actuator according to some embodiments of the present invention, includes: a coil; a first stator that includes a first yoke and a cylindrical guide fixed to an inner peripheral side of the first yoke; a second stator arranged to face the first stator in an axial direction so as to form a magnetic path around the coil together with the first stator; and a mover configured to move in the axial direction toward the second stator from an original position radially inward of the first stator by a magnetic force generated by energizing the coil. The cylindrical guide includes: a magnetic tube disposed in contact with an inner peripheral surface of the first yoke; and a non-magnetic layer covering an inner peripheral surface of the magnetic tube. A minimum distance d1 between the second stator and the magnetic tube of the cylindrical guide is greater than a minimum distance d2 between the second stator and the mover at the original position.

[2] In some embodiments, in the above configuration [1], the cylindrical guide extends in the axial direction toward the second stator beyond a distal end position of the first yoke.

[3] In some embodiments, in the above configuration [1] or [2], the mover, at the original position, extends in the axial direction toward the second stator beyond a distal end position of the cylindrical guide.

[4] In some embodiments, in any one of the above configurations [1] to [3], a distal end portion of the mover, at the original position, overlaps the second stator in the axial direction.

[5] In some embodiments, in any one of the above configurations [1] to [4], the cylindrical guide extends in the axial direction to a rear end of the mover at the original position, or to a side opposite to the second stator beyond the rear end of the mover at the original position.

[6] In some embodiments, in any one of the above configurations [1] to [5], the first yoke has a first through hole into which the cylindrical guide is press-fitted, an inner wall of the first through hole includes: a contact region in contact with an outer peripheral surface of the magnetic tube; and a non-contact region located adjacent to the contact region on a side opposite to the second stator across the contact region in the axial direction, and a diameter of the first through hole at the contact region is the same as that at the non-contact region.

According to at least some embodiments of the present invention, it is possible to increase the magnetic flux transferred between the mover at the original position and the first yoke or the second stator, and to effectively transfer magnetism between the mover at the original position and the first yoke and the second stator. Thus, it is possible to realize a compact and high-thrust solenoid actuator.

DETAILED DESCRIPTION

Figure 1:
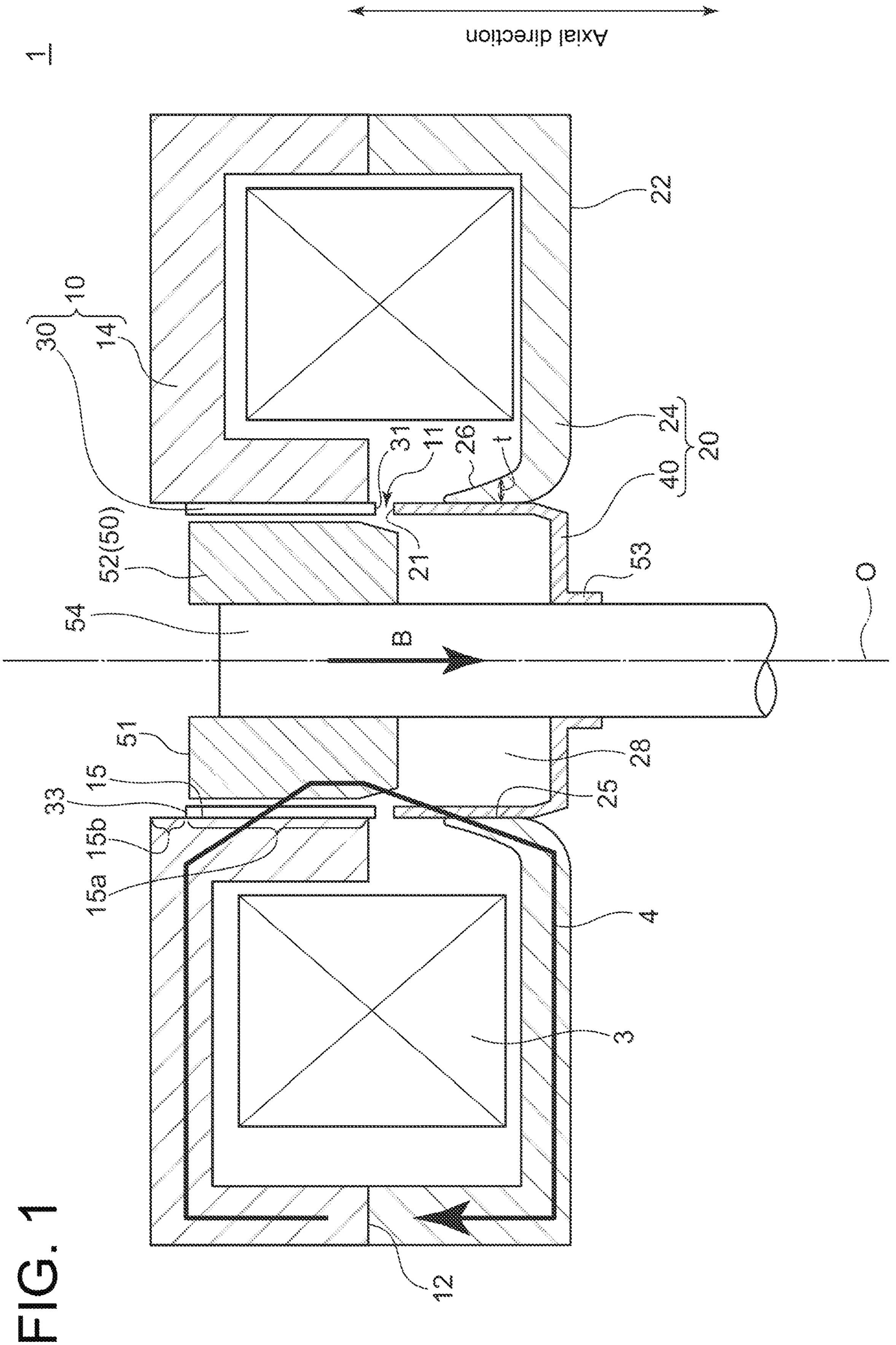
FIG. 1 is a cross-sectional view schematically showing the configuration of a solenoid actuator according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a cross-sectional view schematically showing the configuration of a solenoid actuator according to an embodiment.

FIG. 1 omits illustration of a resin mold of the solenoid actuator. Further, a magnetic path 4 is shown only for one side of a coil 3 (a left-hand area in the figure), but the same magnetic path 4 is formed on either side (a right-hand area in the figure) of the annularly disposed coil 3 as well.

In some embodiments, as shown in FIG. 1, the solenoid actuator 1 includes the coil 3, a stator 10, 20 for forming the magnetic path 4 around the coil 3, and the mover 50 axially movable by a magnetic force generated by the coil 3.

The coil 3 is formed by winding a wire composed of a conductor such as copper or copper alloy around a central axis O of the solenoid actuator 1. The coil 3 has a substantially annular shape centering on the central axis O as a whole. The coil 3 is electrically connected to a terminal (not shown), and power is supplied to the coil 3 via the terminal. When the coil 3 is energized, a magnetic force for attracting the mover 50 is generated.

The coil 3 may be housed in a bobbin (not shown).

The stator 10, 20 includes the first stator 10 and the second stator 20 located on both sides of the coil 3 in the axial direction of the solenoid actuator 1. The stator 10, 20 is composed of a magnetic material that may be, for example, iron and is disposed annularly around the central axis O so as to surround the coil 3.

The first stator 10 and the second stator 20 are arranged so as to face each other across an air gap 11 in the axial direction, on an inner peripheral side of the coil 3 and an outer peripheral side of the mover 50 described later.

The air gap 11 is provided to restrict a magnetic flux flow from the first stator 10 directly toward the second stator 20 without via the mover 50, and to efficiently flow a magnetic flux from the first stator 10 toward the second stator 20 via the mover 50.

In the examples shown in FIG. 1, the first stator 10 and the second stator 20 are in contact with each other at a contact section 12 located on an outer peripheral side of the coil 3.

In this case, the first stator 10 and the second stator 20 may integrally be formed by the resin mold (not shown) in a state where the first stator 10 and the second stator 20 face each other via the air gap 11 on the inner peripheral side of the coil 3 and are in contact with each other at the contact section 12 on the outer peripheral side of the coil 3.

The position of the contact section 12 between the first stator 10 and the second stator 20 is not particularly limited, but the contact section 12 may be located at a central position of the coil 3 in the axial direction as in the examples of FIG. 1, or the contact section 12 may exist at a position different from the central position of the coil 3.

In another embodiment, the solenoid actuator 1 does not have a section where the first stator 10 and the second stator 20 contact each other.

For example, if the solenoid actuator 1 includes at least one another stator other than the first stator 10 and the second stator 20, the at least one another stator may be located between the first stator 10 and the second stator 20, and may form the magnetic path 4 together with the first stator 10 and the second stator 20. The another stator is thus interposed between the first stator 10 and the second stator 20, which may obtain the configuration where the first stator 10 and the second stator 20 do not directly contact each other.

Further, voids may exist between the plurality of stators including the first stator 10 and the second stator 20.

In some embodiments, as shown in FIG. 1, the first stator 10 includes a first yoke 14 and a cylindrical guide 30 fixed to an inner peripheral side of the first yoke 14.

The cylindrical guide 30 fixed to the inner peripheral side of the first yoke 14 faces the second stator 20 across the air gap 11 between the first stator 10 and the second stator 20. That is, a distal end 31 of the cylindrical guide 30 is not in contact with a distal end 21 of the second stator 20, but is separated by the air gap 11.

Herein, the air gap 11 means a minimum gap on the inner peripheral side of the coil 3, and between the second stator 20 and the first stator 10 including the first yoke 14 and the cylindrical guide 30.

The cylindrical guide 30 may be disposed such that the distal end 31 of the cylindrical guide 30 is located in a radial position range at least partially overlapping the distal end 21 of the second stator 20.

In some embodiments, as shown in FIG. 1, the cylindrical guide 30 is disposed such that the distal end 31 projects from the first yoke 14 toward the second stator 20. That is, the cylindrical guide 30 axially extends toward the second stator 20 beyond a distal end position of the first yoke 14.

By thus extending the cylindrical guide 30 toward the second stator 20 beyond the distal end position of the first yoke 14, it becomes easier to secure a magnetism transfer area between the mover 50 and the cylindrical guide 30 (a magnetic tube 32 to be described later), and it is possible to increase a magnetic flux flowing between the second stator 20 and the mover 50 at the original position.

Further, the cylindrical guide 30 may axially extend to a rear end 51 of the mover 50 at the original position, or to a side opposite to the second stator 20 beyond the rear end 51 of the mover 50 at the original position.

In the exemplary embodiment shown in FIG. 1, the cylindrical guide 30 axially extends beyond the rear end 51 of the mover 50 at the original position to the side opposite to the second stator 20. That is, a proximal end 33 opposite to the distal end 31 of the cylindrical guide 30 axially projects from the rear end 51 of the mover 50 at the original position to the side opposite to the second stator 20. By thus extending the cylindrical guide 30 beyond the rear end 51 of the mover 50 at the original position to the side opposite to the second stator 20, it becomes easier to secure the magnetism transfer area between the mover 50 and the cylindrical guide 30 (the magnetic tube 32 to be described later). As a result, an overall magnetic resistance of the magnetic path 4 passing through the mover 50 is reduced, making it possible to increase the magnetic flux flowing between the second stator 20 and the mover 50 at the original position.

The first yoke 14 of the first stator 10 is formed of a magnetic material that may be, for example, iron and is disposed so as to surround the coil 3 together with the second stator 20. The first yoke 14 may contact the second stator 20 at a contact section 12 on the outer peripheral side of the coil 3.

The first yoke 14 has a first through hole 15 for receiving the cylindrical guide 30. The first through hole 15 may be a circular hole concentric with the central axis O of the solenoid actuator 1.

As shown in FIG. 1, an inner wall of the first through hole 15 of the first yoke 14 includes a contact region 15*a* which is in contact with an outer peripheral surface of the cylindrical guide 30 and a non-contact region 15*b* which is not in contact with the outer peripheral surface of the cylindrical guide 30. The non-contact region 15*b* is adjacent to the contact region 15*a* in the axial direction. The non-contact region 15*b* is located opposite to the second stator 20 across the contact region 15*a* in the axial direction.

In some embodiments, an inner diameter of the first through hole 15 at the contact region 15*a* is the same as that at the non-contact region 15*b*. That is, the inner wall of the first through hole 15 is not provided with a step that restricts the axial position of the cylindrical guide 30 with respect to the first yoke 14.

Thus, the step of the inner wall of the first through hole 15 does not hinder the axial positioning of the cylindrical guide 30 with respect to the second stator 20. Accordingly, when assembling the cylindrical guide 30 to the first yoke 14, it is possible to appropriately adjust the axial position of the distal end 31 of the cylindrical guide 30 and it becomes easier to control the air gap 11 with high accuracy.

In some embodiments, as shown in FIG. 1, the second stator 20 includes a second yoke 24 and a second cylindrical member 40 fixed to an inner peripheral side of the second yoke 24.

The second yoke 24 is formed of a magnetic material that may be, for example, iron and is disposed so as to surround the coil 3 together with the first stator 10. The second yoke 24 may contact the first stator 10 at the contact section 12 on the outer peripheral side of the coil 3.

The second yoke 24 has a second through hole 25 for receiving the second cylindrical member 40. The second through hole 25 may be a circular hole concentric with the central axis O of the solenoid actuator 1.

Figure 3:
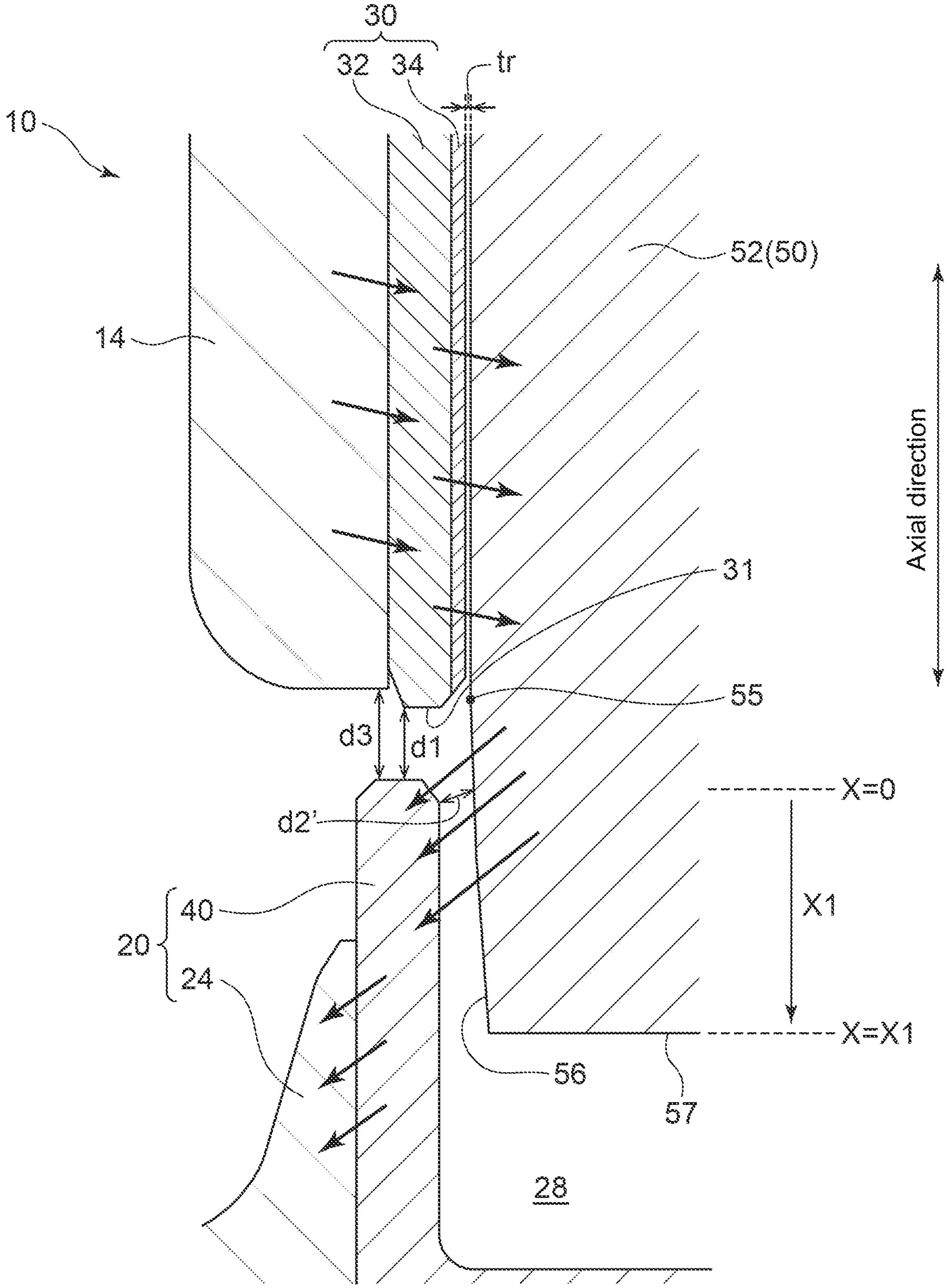
FIG. 3 is a cross-sectional view showing a detailed structure of the solenoid actuator in the magnetic flux transfer region between the stator and the mover according to an embodiment, and shows a state where the mover is at an intermediate position.

In the exemplary embodiment shown in FIG. 3, the second cylindrical member 40 has the distal end 21 of the second stator 20 forming the air gap 11 with the first stator 10.

In another embodiment, the entire second stator 20 is configured as one piece.

As in the embodiment shown in FIG. 1, By providing the second cylindrical member 40 of the second stator 20 directly related to the air gap 11 separately from the second yoke 24, it becomes easier to control the air gap 11 with higher accuracy, as compared with a case where the entire second stator 20 is configured as one piece.

For example, consider a case where, when assembling the cylindrical guide 30 to the first yoke 14, the position of the distal end 31 of the cylindrical guide 30 is adjusted with reference to the reference surface 22 of the second stator 20 (that is, the axial end surface 22 of the second yoke 24 opposite to the first stator 10). In this case, after adjusting the axial position of the distal end 31 of the cylindrical guide 30 with respect to the axial end surface 22 of the second yoke 24, the second cylindrical member 40 may axially be aligned with respect to the axial end surface 22 of the second yoke 24 when assembling the second cylindrical member 40 to the second yoke 24. Consequently, since only the dimension of the second cylindrical member 40 of the second stator 20 (the axial dimension of the second cylindrical member 40 from the reference surface 22 of the second yoke 24 to the air gap 11) substantially affects the air gap 11, the highly accurate air gap 11 can easily be formed.

In some embodiments, as shown in FIG. 1, the second cylindrical member 40 is disposed so as to project from the second yoke 24 toward the first stator 10.

That is, the distal end 21 of the second stator 20 formed by the second cylindrical member 40 is located on the first stator 10 side beyond the distal end of the second yoke 24 in the axial direction.

Some solenoid actuator, such as a linear solenoid, is desirably configured such that a change in attractive force with respect to a current has a linear characteristic. In order to achieve this linear characteristic, the distal end of the second stator, which is disposed downstream in a moving direction of the mover from the original position when the coil is energized, advantageously has a shape tapered toward the air gap.

In this regard, as described above, by axially projecting the second cylindrical member 40 forming the air gap 11 from the second yoke 24, the overall shape of the second stator 20 formed by the second yoke 24 and the second cylindrical member 40 can be made closer to the above-described tapered shape.

In the exemplary embodiment shown in FIG. 1, the second yoke 24 decreases in thickness t toward the air gap 11. That is, the second yoke 24 has a tapered portion 26 with the thickness t decreasing toward the air gap 11, in a distal end region on the air gap 11 side.

Herein, the thickness t of the second yoke 24 is the radial dimension of the second yoke 24.

Since the second yoke 24 thus has a thickness distribution decreasing toward the air gap 11, in combination with the configuration where the second cylindrical member 40 projects from the second yoke 24 toward the first stator 10, the overall shape of the second stator 20 can be made much closer to the aforementioned tapered shape.

When the coil 3 is energized, a magnetic flux flows in the magnetic path 4 formed around the coil 3 by the first stator 10 and the second stator 20 each having the above configuration.

As a result, the mover 50 is attracted by the magnetic flux flowing through the magnetic path 4 and axially moves toward the second stator 20 from the original position radially inward of the first stator 10.

The second stator 20 forms a cavity 28, which is configured to receive the mover 50 axially approaching when the coil 3 is energized, radially inward of the second stator 20.

In the embodiment shown in FIG. 1, the cavity 28 is defined by the second cylindrical member 40 of the second stator 20.

In some embodiments, as shown in FIG. 1*s*, the mover 50 is a plunger 52 disposed at an end portion of a shaft 54 which is an output shaft of the solenoid actuator 1.

The plunger 52 has a through hole into which the shaft 54 is press-fitted. The shaft 54 is press-fitted into the through hole of the plunger 52 such that the axis of the shaft 54 and the axis of the plunger 52 are aligned.

The plunger 52 as the mover 50 is formed of a magnetic material that may be, for example, iron and is mounted on an outer peripheral side of the shaft 54.

The plunger 52 has a diameter which is larger than a diameter of the shaft 54 and is smaller than an inner diameter of cylindrical guide 30 of first stator 10. Further, the diameter of the plunger 52 is smaller than the diameter of the cavity 28 formed by the second stator 20.

When the coil 3 is in the non-excited state, the shaft 54 is biased by a spring (not shown) in a direction opposite to an arrow B, and the plunger 52 as the mover 50 is located radially inward of the first stator 10 (cylindrical guide 30). At this time, it is only necessary that the plunger 52 is substantially be located radially inward of the cylindrical guide 30, and the end portion of the plunger 52 may project from the first stator 10 (cylindrical guide 30) toward the second stator 20.

On the other hand, when the coil 3 is energized, the plunger 52 as the mover 50 intrudes in the cavity 28 formed radially inward of the second stator 20. At this time, it is only necessary that at least a portion of the plunger 52 is located within the cavity 28, and a remaining portion of the plunger 52 may project from the cavity 28 toward the first stator 10.

The shaft 54 to which the plunger 52 having the above configuration is fixed penetrates the second stator 20 and extends to the outside of the solenoid actuator 1. The shaft 54 is moved in the direction of the arrow B by the actuation of the solenoid actuator 1, and transmits a driving force of the solenoid actuator 1 to an external device (not shown).

The external device driven by the solenoid actuator 1 is not particularly limited, but may be, for example, a spool for hydraulically controlling a valve timing of an intake valve or an exhaust valve of a vehicle engine.

The shaft 54 may slidably be supported on the second stator 20 side by a bearing.

In the embodiment shown in FIG. 1, a radially inner portion of the second cylindrical member 40 forming part of the second stator 20 functions as a bearing portion 53, and the shaft 54 is slidably supported by the bearing portion 53 of the second cylindrical member 40.

Figure 2:
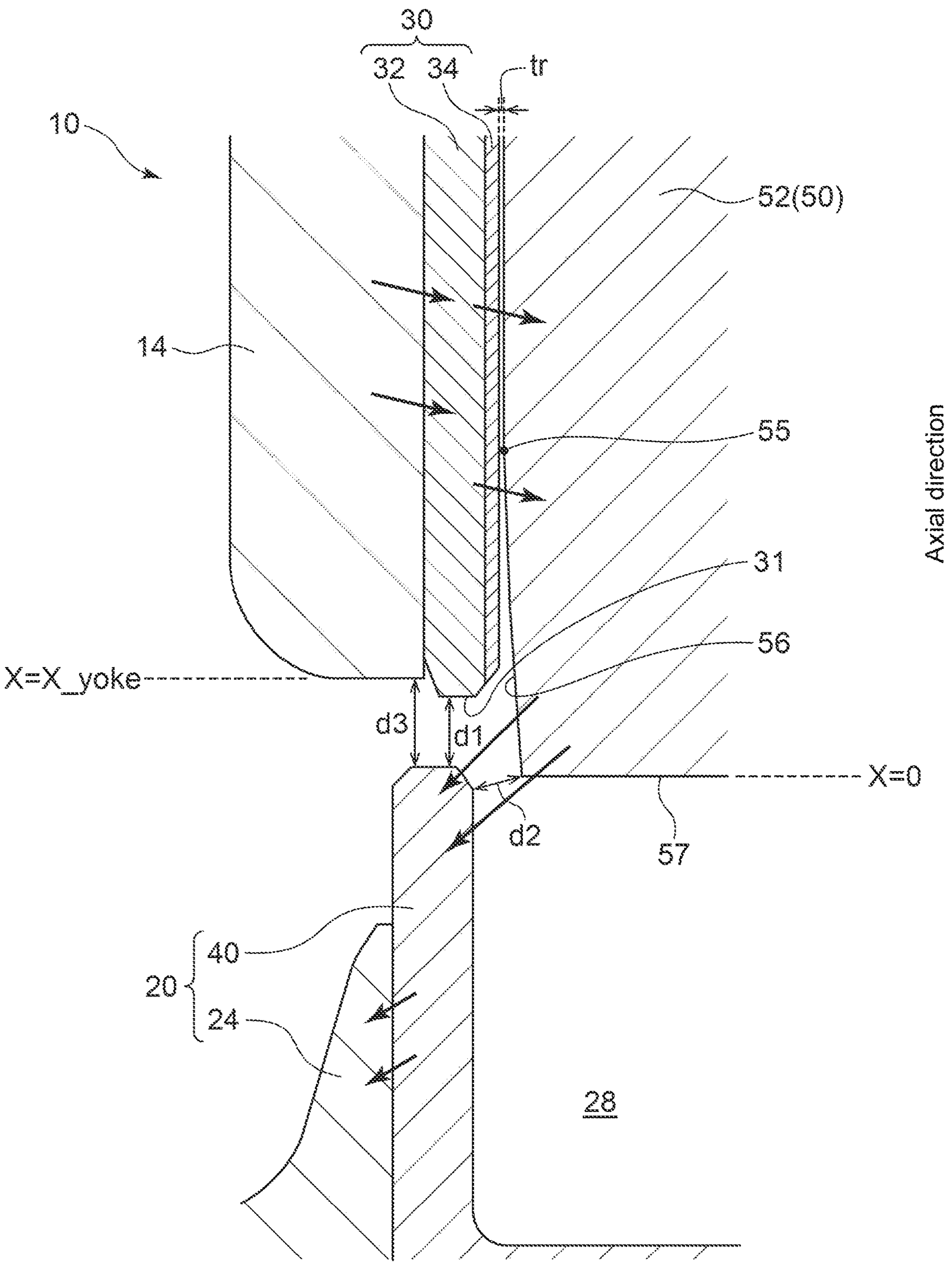
FIG. 2 is a cross-sectional view showing a detailed structure of the solenoid actuator in a magnetic flux transfer region between a stator and a mover according to an embodiment, and shows a state where the mover is at an original position.
Figure 4:
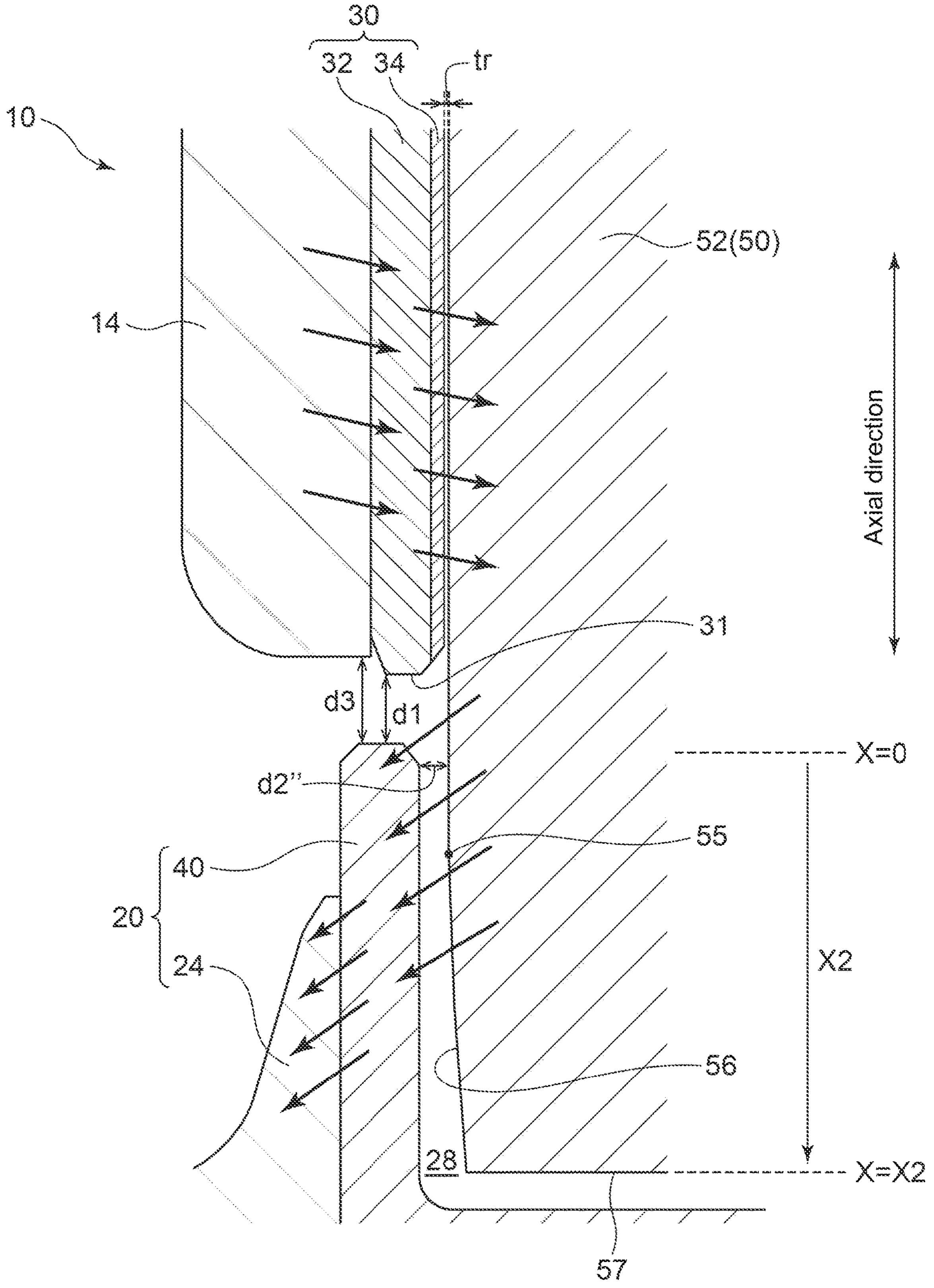
FIG. 4 is a cross-sectional view showing a detailed structure of the solenoid actuator in the magnetic flux transfer region between the stator and the mover according to an embodiment, and shows a state where the mover is at a maximum stroke position.

FIGS. 2 to 4 are each a cross-sectional view showing a detailed structure of the solenoid actuator in a magnetic flux transfer region between the stator and the mover according to an embodiment.

FIG. 2 shows a non-excited state of the coil 3 in which the mover 50 exists at the original position. Herein, the original position of the mover 50 is represented as X=0 using a position coordinate X of an end surface of the mover 50, and can be rephrased as a stroke start position where a stroke amount of the solenoid actuator 1 is zero.

By contrast, FIG. 3 shows a state in which the mover 50 moves by a stroke amount X1 with reference to the original position, and the position coordinate X of the end surface of the mover 50 is the intermediate position X1. Likewise, FIG. 4 shows a state in which the mover 50 moves by a maximum stroke amount X2 with reference to the original position, and the position coordinate X of the end surface of the mover 50 is the maximum stroke position X2 (>X1).

In some embodiments, as shown in FIGS. 2 to 4, the cylindrical guide 30 includes the magnetic tube 32 with an outer peripheral surface contacting the inner wall of the first through hole 15 of the first yoke 14, and a non-magnetic layer 34 formed on an inner peripheral surface of the magnetic tube 32.

The magnetic tube 32 is composed of a magnetic material that may be, for example, iron, and faces the second stator 20 across the air gap 11. That is, the magnetic tube 32 of the magnetic portion of the first stator 10 including the first yoke 14 and the cylindrical guide 30 is disposed closest to the distal end 21 of the second stator 20.

A radial position range of the magnetic tube 32 may at least partially overlap the radial position range of the distal end 21 of the second stator 20 that forms the air gap 11 with the magnetic tube 32.

The non-magnetic layer 34 of the cylindrical guide 30 is disposed on the inner peripheral surface of the magnetic tube 32 so as to face the outer peripheral surface of the mover 50.

Whereby, the cylindrical guide 30 can axially guide the mover 50 by bringing the mover 50 into sliding contact with the non-magnetic layer 34.

The non-magnetic layer 34 may be composed of a low-friction material such as copper or PTFE (polytetrafluoroethylene). The non-magnetic layer 34 may be deposited on the inner surface of the cylindrical guide 30 by an application method such as sintering or impregnation, for example. In the exemplary embodiment, the non-magnetic layer 34 is formed by impregnating a copper alloy porous layer formed by sintering with a resin material containing PTFE.

In general, a guide (bearing) for constraining a radial position of a mover and axially guiding the mover is provided at a location separate from a radial magnetic gap between a yoke and the mover. In this case, if the axis of the yoke is eccentric with respect to the guide for regulating the radial position of the mover, the magnetic gap between the mover and the yoke on an outer peripheral side of the mover is also affected by the eccentricity. Therefore, it is necessary to secure a relatively wide magnetic gap between the mover and the yoke on the outer peripheral side of the mover, taking into account the influence of misalignment of the yoke with respect to the guide (bearing).

In this regard, as in the embodiments shown in FIGS. 2 to 4, if the cylindrical guide 30, which is capable of realizing the guide function for axially guiding the mover 50 by the non-magnetic layer 34, is fixed to the inner peripheral side of the first yoke 14, it is possible to substantially eliminate the influence of misalignment of the first yoke 14 with respect to the cylindrical guide 30. Therefore, a radial clearance tr to be secured between the cylindrical guide 30 and the mover 50 is sufficient to have a size that allows for assembly of the mover 50. As a result, a magnetic gap between the first stator 10 and the mover 50 can be reduced, and the magnetic flux from the first stator 10 toward the mover 50 can be increased.

The magnetic gap between the first stator 10 and the mover 50 in this case is the sum of the above-described radial clearance tr and the thickness of the non-magnetic layer 34.

As shown in FIG. 2, a minimum distance d1 between the magnetic tube 32 of the cylindrical guide 30 and the second stator 20 (second cylindrical member 40) is greater than a minimum distance d2 between the mover 50 at the original position and the second stator 20 (second cylindrical member 40).

By thus satisfying the relation of d1>d2, a magnetic resistance in the gap between the magnetic tube 32 and the second stator 20 becomes greater than a magnetic resistance in the gap between the second stator 20 and the mover 50 at the original position. As a result, it is possible to increase the magnetic flux flowing between the second stator 20 and the mover 50 at the original position.

Conventionally, there has also been proposed a structure in which an annular mover is supported by a yoke from an inner peripheral side via a guide. In this regard, in the solenoid actuator 1, since the cylindrical guide 30 is located radially outward of the mover 50, it is possible to secure a large area of the annular magnetic gap between the mover 50 and the magnetic tube 32 of the cylindrical guide 30, compared to the above-described conventionally proposed structure. This is because the area of the magnetic gap is represented by the product of the axial length and the peripheral length of the magnetic gap, and the peripheral length of the magnetic gap relatively increases when the magnetic gap is formed radially outward. Since the magnetism transfer area (the area of the magnetic gap) between the magnetic tube 32 and the mover 50 thus increases, the overall magnetic resistance of the magnetic path 4 decreases, making it possible to also increase the magnetic flux flowing between the second stator 20 and the mover 50 at the original position.

Thus, it is possible to effectively transfer the magnetism between the mover 50 at the original position and the first stator 10 and the second stator 20 (see arrows in FIG. 2), and it is possible to realize the compact and high-thrust solenoid actuator 1.

Herein, in order to increase the magnetism transfer area between the magnetic tube 32 and the mover 50, it is advantageous to make the cylindrical guide 30 as long as possible. On the other hand, in order to secure the magnetic flux passing through the mover 50 at the original position, it is desirable to impose a restriction on the distal end position of the cylindrical guide 30 such that the above-described relation of d1>d2 is established.

In this regard, by making the first through hole 15 of the first yoke 14 to have the same diameter between the non-contact region 15*b* and the contact region 15*a* in contact with the outer peripheral surface of the cylindrical guide 30 (magnetic tube 32) of the inner wall of the first through hole 15 as in the embodiment described above with reference to FIG. 1, it is possible to adjust the position of the distal end 31 of the cylindrical guide 30 with high accuracy. Thus, the cylindrical guide 30 can sufficiently be made long at the limit where the relation of d1>d2 is satisfied, and it is possible to achieve both securing of the magnetism transfer area between the magnetic tube 32 and the mover 50 and the increase in magnetic flux passing through the mover 50 at the original position.

In some embodiments, as shown in FIGS. 2 to 4, the cylindrical guide 30 axially extends toward the second stator 20 beyond a distal end position X_yoke of the first yoke 14. The minimum distance d1 between the magnetic tube 32 of the cylindrical guide 30 and the second stator 20 (second cylindrical member 40) may be smaller than a minimum distance d3 between the first yoke 14 and the second stator 20 (second cylindrical member 40).

By extending the cylindrical guide 30 toward the second stator 20 beyond the distal end position X of the first yoke 14, it becomes easier to secure the magnetism transfer area between the mover 50 and the magnetic tube 32 of the cylindrical guide 30, and it is possible to increase the magnetic flux flowing between the second stator 20 and the mover 50 at the original position.

Meanwhile, if the distal end of the cylindrical guide 30 is brought too close to the second stator 20, the magnetic flux flowing between the magnetic tube 32 and the second stator 20 without via the mover 50 increases, which may result in a decrease in magnetic flux between the mover 50 and the second stator 20. In this regard, by imposing the restriction on the distal end position of the cylindrical guide 30 (magnetic tube 32) so as to satisfy the above-described relation of d1>d2, it is possible to sufficiently secure the magnetic flux flowing between the mover 50 at the original position and the second stator 20.

In some embodiments, the mover 50 (plunger 52) at the original position (X=0) axially extends toward the second stator 20 beyond the position of the distal end 31 of the cylindrical guide 30. That is, the distal end portion of the mover 50 at the original position axially projects from the cylindrical guide 30 toward the second stator 20.

Thus, it becomes easier to establish the above-described relation (d1>d2) where the minimum distance d2 between the mover 50 and the second stator 20 is smaller than the minimum distance d1 between the magnetic tube 32 and the second stator 20.

In the exemplary embodiment shown in FIG. 2, the distal end portion of the mover 50 at the original position (X=0) axially overlaps the second stator 20. That is, the distal end portion of the mover 50 at the original position (X=0) intrudes into the cavity 28 defined by the second stator 20 (second cylindrical member 40).

Thus, it becomes much easier to establish the above-described relation (d1>d2) where the minimum distance d2 between the mover 50 and the second stator 20 is smaller than the minimum distance d1 between the magnetic tube 32 and the second stator 20.

In the exemplary embodiments shown in FIGS. 2 to 4, the outer peripheral surface of the mover 50 (plunger 52) has a tapered surface 56, which is tapered such that the outer diameter decreases toward the distal end, between the distal end and a reference point 55.

When the mover 50 is at an original position X0, the reference point 55 indicating a boundary of the tapered distal end region (tapered surface 56) of the outer peripheral surface of the mover 50 is located radially inward of the cylindrical guide 30, and the minimum distance d2 between the second stator 20 and the mover 50 at the original position is a distance between the second cylindrical member 40 and an outer peripheral edge of a distal end surface 57 of the mover 50, as shown in FIG. 2.

When the mover 50 is at the intermediate position X1, an axial position of the reference point 55 on the outer peripheral surface of the mover 50 substantially coincides with the distal end position of the cylindrical guide 30, and a minimum distance d2' between the mover 50 and the second stator 20 is a distance between the second cylindrical member 40 and the tapered surface 56 of the mover 50, as shown in FIG. 3.

When the mover 50 is at the maximum stroke position X2, the reference point 55 indicating the boundary of the tapered distal end region of the outer peripheral surface of the mover 50 exists in the cavity 28 formed by the second stator 20 (second cylindrical member 40). At this time, as shown in FIG. 4, a minimum distance d2" between the mover 50 and the second stator 20 is a distance between the second cylindrical member 40 and a region of the outer peripheral surface of the mover 50 in the rear of the reference point 55.

The minimum distance between the mover 50 and the second stator 20 decreases as the stroke amount of the mover 50 increases, and the relation of d2>d2'>d2" is established.

When the mover 50 is at the original position (X=0), as shown in FIG. 2, the magnetism transfer area between the mover 50 and the second cylindrical member 40 is smaller than the magnetism transfer area between the cylindrical guide 30 and the mover 50. Further, the magnetic gap (distance d2) between the mover 50 and the second cylindrical member 40 is greater than the magnetic gap between the cylindrical guide 30 and the mover 50 (the sum of the radial clearance tr and the thickness of the non-magnetic layer 34). Therefore, when the mover 50 is at the original position (X=0), the magnetic gap between the mover 50 and the second cylindrical member 40, which accounts for most of the magnetic resistance of the entire magnetic path, restricts the magnetic flux flowing through the magnetic path, and the magnetic flux flowing through the magnetic path when the coil 3 is energized is relatively small.

When the mover 50 moves to the intermediate position X1, compared to the case of the original position (X=0) shown in FIG. 2, an intrusion length of the mover 50 into the cavity 28 increases, increasing the magnetism transfer area between the mover 50 and the second stator 20 (second cylindrical member 40), and increasing the magnetic flux flowing through the magnetic path 4. Compared to the case of the original position (X=0) shown in FIG. 2, the magnetism transfer area between the cylindrical guide 30 and the mover 50 is decreased due to the decrease in axial overlapping length between the cylindrical guide 30 and the mover 50. However, as described above, since the magnetic resistance of the magnetic gap between the mover 50 and the second cylindrical member 40, which accounts for most of the magnetic resistance of the entire magnetic path at the original position (X=0), is reduced, the magnetic flux flowing through the magnetic path 4 increases as a whole.

When the mover 50 moves to the maximum stroke position X2, compared to the case of the intermediate position X1 shown in FIG. 3, the intrusion length of the mover 50 into the cavity 28 further increases, increasing the magnetism transfer area between the mover 50 and the second stator 20 (second cylindrical member 40), and further increasing the magnetic flux flowing through the magnetic path 4.

Herein, as the mover 50 moves from the original position (X=0) toward the maximum stroke position (X=X2), the intrusion length of the mover 50 into the cavity 28 increases. Thus, as the stroke amount of the mover 50 increases, a radial component of a magnetic flux vector from the mover 50 toward the second stator 20 (second cylindrical member 40) increases and an axial component decreases, which may decrease the thrust of the solenoid actuator.

In this regard, as described above, in the embodiments shown in FIGS. 2 to 4, since the tapered surface 56 is formed on the outer peripheral surface of the mover 50 (plunger 52), the outer peripheral surface of the mover 50 approaches the inner peripheral surface of the second stator 20 (second cylindrical member 40) as the stroke amount increases. As a result, it is possible to suppress the decrease in thrust.

Next, a specific structural example of the solenoid actuator 1 will be described with reference to FIG. 5.

Hereinafter, the description of the features described above with reference to FIGS. 1 to 4 will be omitted.

Figure 5:
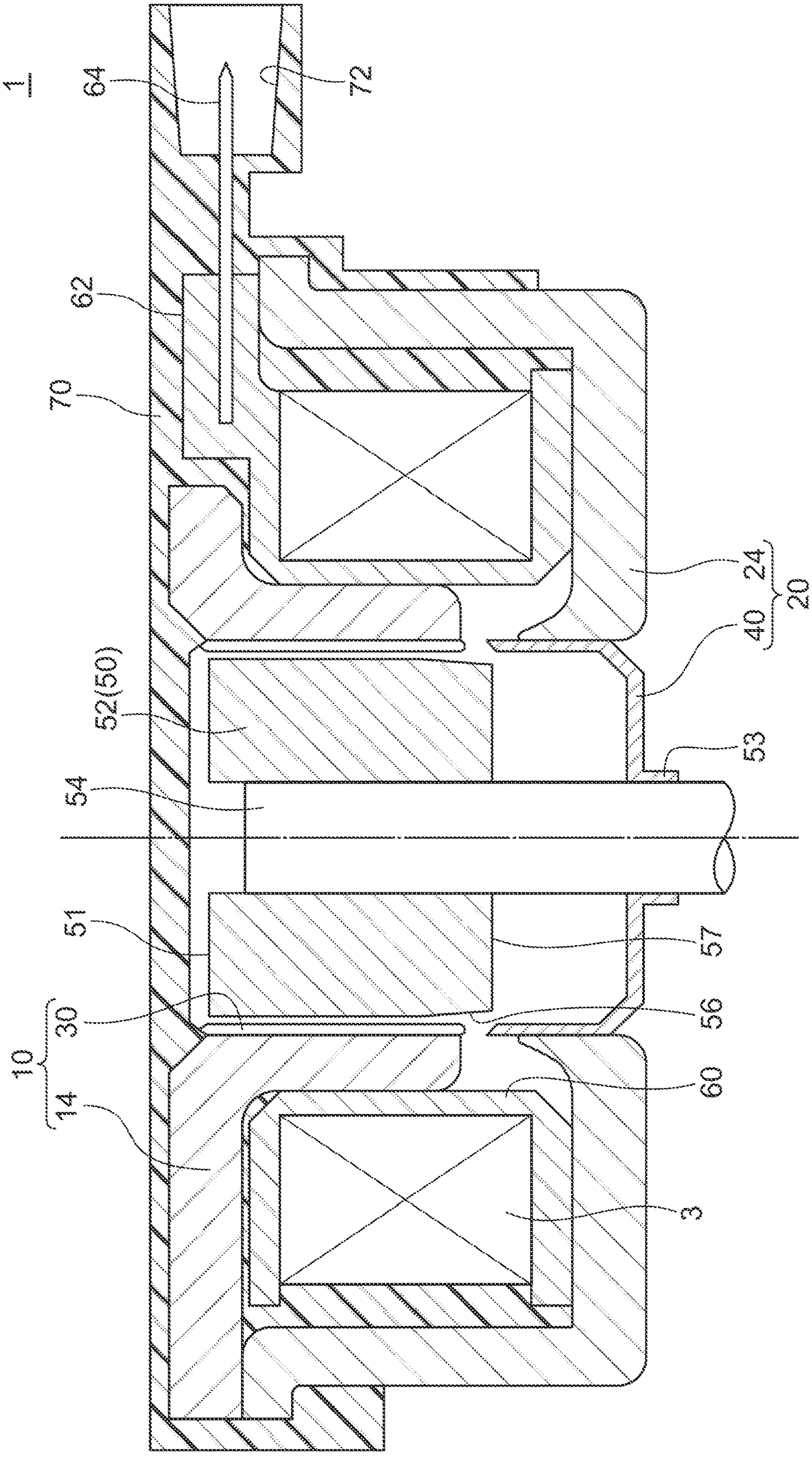
FIG. 5 is a cross-sectional view showing the solenoid actuator according to an embodiment.

FIG. 5 is a cross-sectional view showing the solenoid actuator according to an embodiment.

As shown in FIG. 6, the solenoid actuator 1 includes the coil 3, the first stator 10 and the second stator 20, and the mover 50 (plunger 52).

The coil 3 is formed by winding a wire composed of a conductor such as copper or copper alloy around a bobbin 60. The bobbin 60 is substantially surrounded by the first stator 10 and the second stator 20. However, the first stator 10 (first yoke 14) is provided with a notch in a partial circumferential range, and a terminal holding portion 62 of the bobbin 60 is exposed in the notch of the first yoke 14. The terminal holding portion 62 of the bobbin 60 is embedded with a proximal end portion of a terminal 64. The terminal 64 is electrically connected to the wire, which constitutes the coil 3, in the bobbin 60.

Further, in the solenoid actuator 1, the coil 3 and the bobbin 60, and the first stator 10 and the second stator 20 are integrally molded in a resin mold 70 and embedded in the resin mold 70. The terminal 64 penetrates the resin mold 70 from the terminal holding portion 62 of the bobbin 60, projects into a recess 72 disposed in the resin mold 70, and can electrically be connected to an external terminal fitted into the recess 72.

The resin mold 70 may have a projection (not shown) that contacts a rear end 51 of the mover 50 (plunger 52) located at the original position.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

The invention claimed is:

1. A solenoid actuator, comprising:
- a coil;
- a first stator that includes a first yoke and a cylindrical guide fixed to an inner peripheral side of the first yoke;
- a second stator arranged to face the first stator in an axial direction so as to form a magnetic path around the coil together with the first stator; and
- a mover configured to move in the axial direction toward the second stator from an original position radially inward of the first stator by a magnetic force generated by energizing the coil,
- wherein the cylindrical guide includes:
  - a magnetic tube disposed in contact with an inner peripheral surface of the first yoke; and
  - a non-magnetic layer covering an inner peripheral surface of the magnetic tube, and
- wherein a minimum distance d1 between the second stator and the magnetic tube of the cylindrical guide is greater than a minimum distance d2 between the second stator and the mover at the original position.

2. The solenoid actuator according to claim 1,
- wherein the cylindrical guide extends in the axial direction toward the second stator beyond a distal end position of the first yoke.

3. The solenoid actuator according to claim 1,
- wherein the mover, at the original position, extends in the axial direction toward the second stator beyond a distal end position of the cylindrical guide.

4. The solenoid actuator according to claim 1,
- wherein a distal end portion of the mover, at the original position, overlaps the second stator in the axial direction.

5. The solenoid actuator according to claim 1,
- wherein the cylindrical guide extends in the axial direction to a rear end of the mover at the original position, or to a side opposite to the second stator beyond the rear end of the mover at the original position.

6. The solenoid actuator according to claim 1,
- wherein the first yoke has a first through hole into which the cylindrical guide is press-fitted,
- wherein an inner wall of the first through hole includes:
  - a contact region in contact with an outer peripheral surface of the magnetic tube; and
  - a non-contact region located adjacent to the contact region on a side opposite to the second stator across the contact region in the axial direction, and wherein a diameter of the first through hole at the contact region is the same as that at the non-contact region.

* * * * *